US008689422B2

(12) United States Patent
Raff

(10) Patent No.: US 8,689,422 B2
(45) Date of Patent: Apr. 8, 2014

(54) SECURING PLUGS FOR ATTACHING COMPUTER COMPONENTS

(75) Inventor: John Raff, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 13/189,260

(22) Filed: Jul. 22, 2011

(65) Prior Publication Data

US 2013/0022382 A1 Jan. 24, 2013

(51) Int. Cl.
*B23K 26/20* (2006.01)
*B21D 39/00* (2006.01)
*G06F 3/02* (2006.01)

(52) U.S. Cl.
USPC .. 29/521; 29/525.05; 29/525.14; 219/121.63; 219/121.64; 400/472

(58) Field of Classification Search
USPC ............. 219/121.63, 121.64, 121.13, 121.14, 219/121.45, 121.46, 117.1, 137 R; 228/101, 228/135–137, 164, 173.1, 173.6, 262.41, 228/262.5; 29/521, 525.14, 525.05
See application file for complete search history.

(56) References Cited

U.S. PATENT DOCUMENTS

| 4,306,654 A * | 12/1981 | Grube ........................... 206/343 |
| 7,030,333 B2 * | 4/2006 | Bradley .......................... 219/99 |
| 8,250,728 B2 * | 8/2012 | Stevenson et al. .......... 29/525.14 |
| 2010/0009211 A1 * | 1/2010 | Tsai .............................. 428/596 |

FOREIGN PATENT DOCUMENTS

| DE | 102007036416 A1 * | 2/2009 | ............. B23K 11/20 |
| JP | 05174940 A * | 7/1993 | ............. H01R 43/02 |

* cited by examiner

*Primary Examiner* — Daniel J Colilla
(74) *Attorney, Agent, or Firm* — Womble Carlyle Sandridge & Rice LLP

(57) ABSTRACT

A keyboard assembly for a small form factor computer includes a number of keys and associated electrical contacts positioned between the top case portion of the computer and the feature plate. The attachment of the keyboard assembly during the manufacturing process can be accelerated by welding securing fasteners through small holes in the feature plate directly to the top case portion of the computer.

13 Claims, 8 Drawing Sheets

SECURING PLUGS FOR ATTACHING COMPUTER COMPONENTS

BACKGROUND

1. Field of the Described Embodiments

The described embodiments relate generally to methods for attaching computer components together. In particular methods, apparatus, and systems for attaching a feature plate to a laptop enclosure are disclosed.

2. Related Art

The outward appearance of a computing system, including its design, heft, assembly and durability is important to many consumers of computing systems. In particular, a durable assembly will help extend the overall life of the computing system and will thus increase its value to the user. When it comes to the manufacture of such computing systems, which include portable devices such as PDAs and laptop computers, various automated assembly processes can introduce a significant cost savings for the manufacturer. Computer numerical control ("CNC") machines are one example of automated assembly machines that are ubiquitous in many manufacturing plants and environments, which can include machinery involving drilling, cutting, lathing, routing, grinding and other component manufacturing and handling processes.

The welding process can also be automated, and is one efficient way to attach components to a device. In the welding process an area of sheet metal in contact with another metal surface with similar thermal properties is typically heated by, for example, resistance spot welding or laser beam welding in such a way that the two materials will melt enough to bond to each other. In the conventional resistance spot welding (RSW) electricity is run through sections of metal to be welded and the heat is created by the metal's natural resistance to the electricity running through it. Unfortunately precisely targeting a RSW beam can be challenging and the RSW process also tends to harden the material, causing it to warp, reducing the material's fatigue strength, and may even stretch the material as well as anneal it. Conversely, laser beam welding can be targeted with great precision and does not suffer from the same electrical side effects as RSW. Unfortunately materials that have significant thermal dissimilarity are more difficult to weld together. For example, the substantially different melting temperatures of aluminum and steel prevent spot welding of the two materials. Consequently a more efficient joining technique would be required.

In particular, what is desired are designs and techniques that enable automated high speed assembly of computer components in a less costly yet still reliable manner.

SUMMARY OF THE DESCRIBED EMBODIMENTS

The paper describes many embodiments that relate to a method, computer readable medium, and apparatus for the manufacture of a keyboard assembly.

A method for welding together a first component formed of a first material and a second component formed of a second material having a plurality of cavities each of which extend through the second component. The method includes a first step of placing a securing plug inside one of the plurality of cavities. The securing plug itself includes: a top portion that extends beyond a lateral dimension of the cavity, the top portion arranged to provide a targeting surface for receiving energy; and a body portion having a size and shape in accordance with the cavity. When placed the body portion should be in direct physical contact with a first portion of the first component. In the second step an amount of energy is directed at any location of the top portion of the securing plug. The amount of energy should be sufficient to fuse at least some of the body portion of the plug and at least some of the first portion of the first component without substantially affecting the integrity of the second component.

The method above, where the securing plug is formed from one of a plurality of pre-formed securing plugs each initially formed on a thin aluminum sheet at locations that correspond to each of the plurality of cavities. The placing from the previous method includes the following steps: (1) positioning the sheet of pre-formed securing plugs in relation to the feature plate such that most of the pre-formed securing plugs align with a corresponding one of the plurality of cavities, the pre-formed securing plugs comprising a central plug region and circumferentially located cut out regions; and (2) forming the securing plug by applying a swaging force to the central plug region causing the central plug region to detach from the remainder of the sheet at the circumferentially located cut out regions, the swaging force also causing the detached central plug region to mechanically deform at a top surface of the first component to form the securing plug.

A keyboard assembly includes a top case, a number of key caps, and a feature plate having a plurality of cavities. The feature plate is secured to the top case by placing securing plugs in contact with the corresponding cavities. The securing plug itself includes: a top portion that extends beyond a lateral dimension of the cavity, the top portion arranged to provide a targeting surface for receiving energy; and a body portion having a size and shape in accordance with the cavity. When placed the body portion should also be in direct physical contact with a first portion of the top case.

A non-transitory computer readable medium including at least computer program code executed by a processor in a computer manufacturing apparatus for welding together a first component formed of a first material and a second component formed of a second material having a number of cavities each of which extend through the second component. The computer readable medium includes computer code for placing a securing plug inside one of the plurality of cavities; and computer code for directing an amount of energy at any location on a top portion of the securing plug, the amount of energy being sufficient to fuse at least some of a bottom portion of the plug and at least some of a top portion of the first component without substantially affecting the integrity of the second component.

An apparatus for welding together a first component formed of a first material and a second component formed of a second material having a number of cavities each of which extend through the second component. The apparatus includes a means for placing a securing plug inside one of the plurality of cavities. The securing plug including a top portion that extends beyond a lateral dimension of the cavity arranged to provide support for the securing plug, and a body portion having a size and shape in accordance with the cavity, a bottom surface of the body portion being substantially flush with a surface of the first component. The apparatus also includes a means for directing an amount of energy to the top portion, the amount of energy being sufficient to fuse at least some of the body portion of the plug to the surface of the first component without substantially affecting the integrity of the second component.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF EXAMPLE EMBODIMENTS

Representative applications of apparatuses and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The present disclosure generally relates to various computer components. Although the following specific embodiments have been described with respect to a computer keyboard, such as a built-in keyboard for a laptop computer, it will be readily appreciated that other computer components and processes may be similarly applicable without departing from the inventive features described herein and claimed below. Furthermore, the disclosed keyboard assembly or other components can also be designed and used for desktop or server based computing systems, and not just laptops or other portable computing systems. Further alternative embodiments will be readily appreciated by those skilled in the art.

Figure 1A:
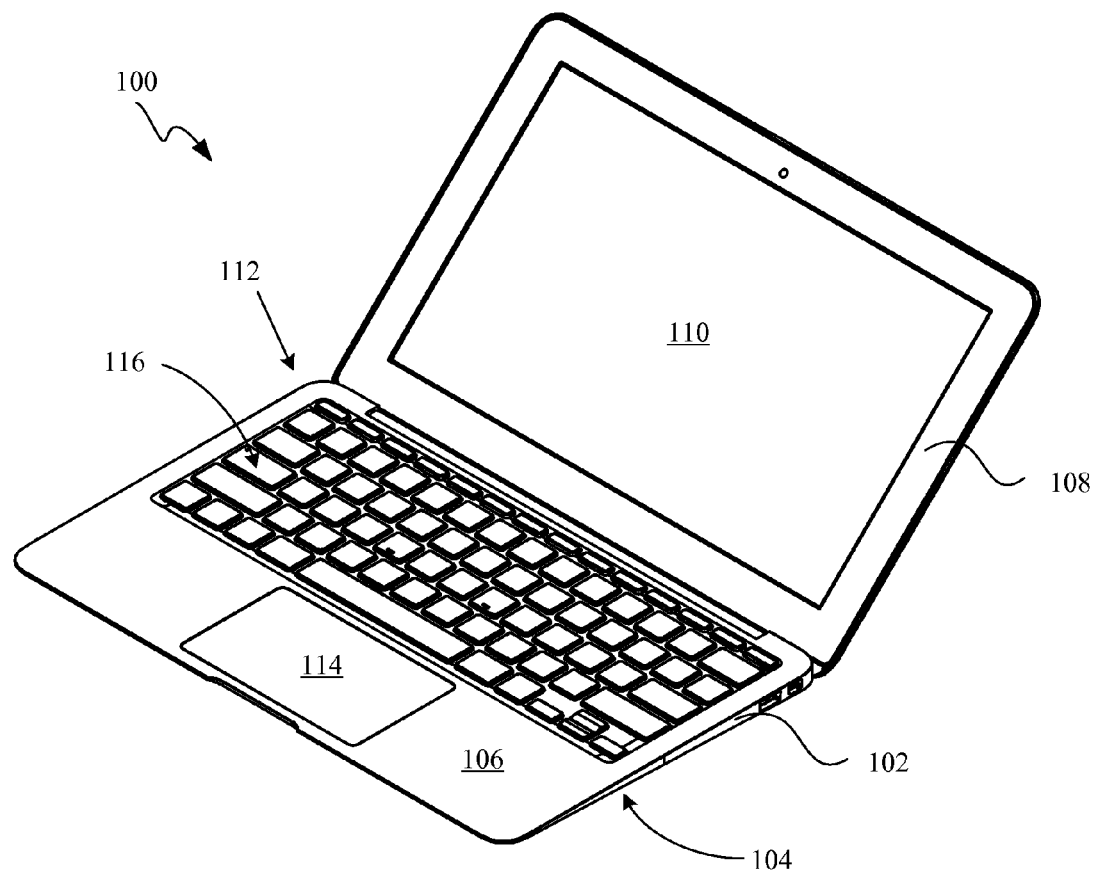
FIG. 1A illustrates in front perspective view a portable computing system in an opened configuration in accordance with the described embodiments.
Figure 1B:
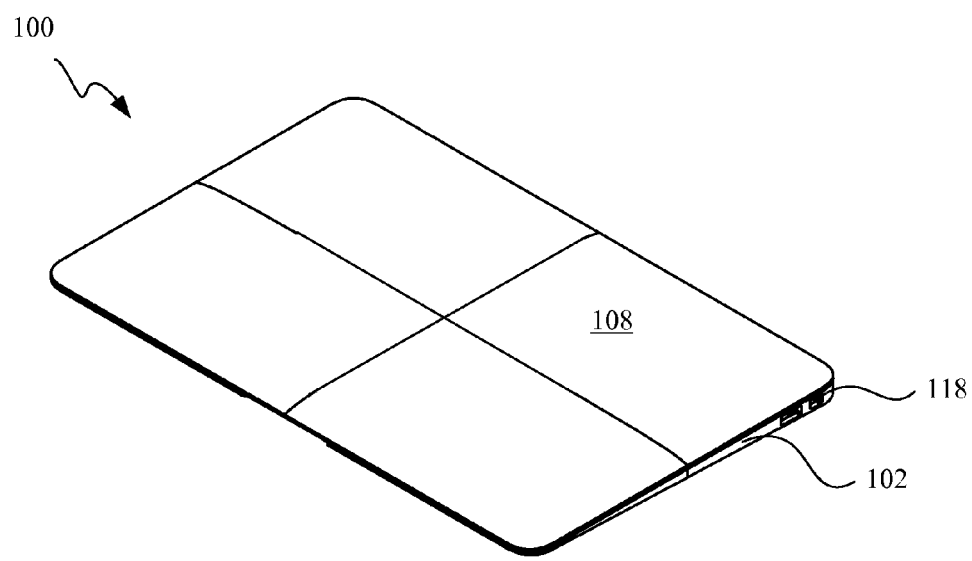
FIG. 1B illustrates in front perspective view the exemplary portable computing system of FIG. 1A in a closed configuration in accordance with the described embodiments.

Referring first to FIGS. 1A and 1B, representative portable computing system 100 in opened and closed configurations is shown in front perspective views. Portable computing system 100 can be, for example, a laptop computer, and can include base portion 102 formed of bottom case 104 fastened to top case 106. Base portion 102 can be pivotally connected to lid portion 108, which can in turn include display 110. Although base portion 102 can have an overall wedge shape as shown, numerous other shapes and sizes may also be used. Top case 106 can be configured to accommodate various user input devices such as keyboard 112 and touchpad 114. Keyboard 112 can include a number of low profile keycap assemblies each having an associated key cap or pad 116.

Each of a number of key pads 116 can have a symbol imprinted thereon for identifying the key input associated with the particular key pad. Keyboard 112 can be arranged to receive a discrete input at each keypad using a finger motion referred to as a keystroke. The symbols on each key pad can be laser etched thereby creating an extremely clean and durable imprint that will not fade under the constant application of keystrokes over the life of portable computing system 100. Touch pad 114 can be configured to receive finger gestures. A finger gesture can include touch events from more than one finger applied in unison. The gesture can also include a single finger touch event such as a swipe or a tap. One or more data ports, power inlets and the like 118 may also be included along the exterior of portable computer system 100, as will be readily appreciated.

The top case 106 can include a cavity, or lumen, into which a number of operational components can be inserted during an assembly operation. Such operational components can be inserted into the lumen and attached to the top case in a "top-bottom" assembly operation in which top most components are inserted first followed by components in a top down arrangement. For example, the top case can be provided and shaped to accommodate a keyboard module. The keyboard module can include a keyboard assembly formed of a number of keycap assemblies and associated circuitry, such as a flexible membrane on which can be incorporated a switching matrix. In one embodiment, the keycap assemblies can take the form of low profile keycaps.

Figure 2A:
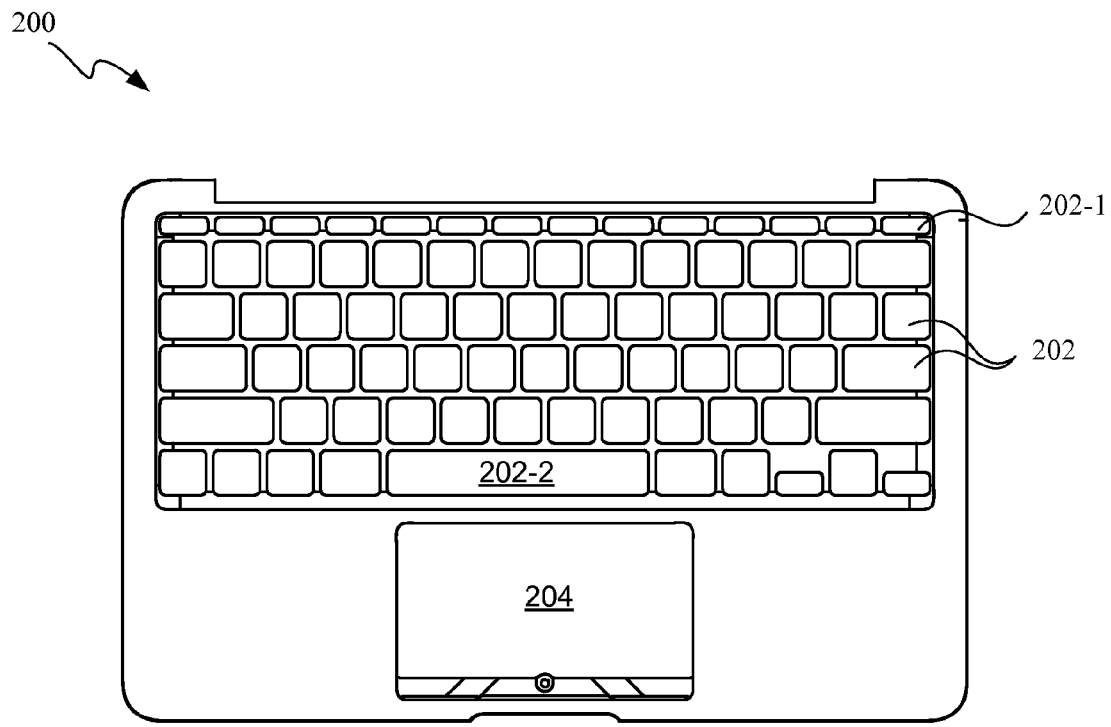
FIG. 2A illustrates in top plan view a top case housing, including various openings to accommodate a keyboard and a touchpad in accordance with the described embodiments.
Figure 2B:
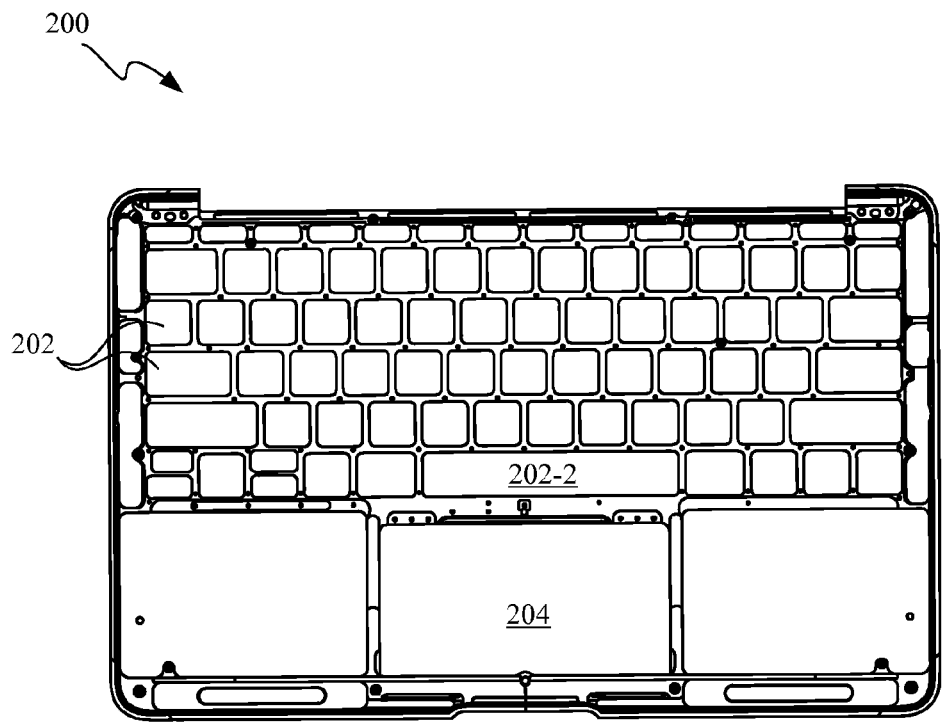
FIG. 2B illustrates in bottom plan view the obverse side of the top case housing in accordance with the described embodiments.

FIG. 2A illustrates in top plan view a top case housing 200, including various openings to accommodate a keyboard and a touchpad according to one embodiment of the described embodiments. FIG. 2B illustrates in bottom plan view the obverse side of the top case housing of FIG. 2A. Top case housing 200 can have a plurality of keyboard openings 202 that can each have a size and shape in accordance with a specific key cap assembly. For example, opening 202-1 can be sized to accommodate a power button, whereas opening 202-2 can be sized to accommodate a space bar. In addition to keyboard openings 202, opening 204 can provide support for a touch pad. Additional top case items can include attachment features, recesses, notches and the like, as will be readily appreciated.

Figure 3:
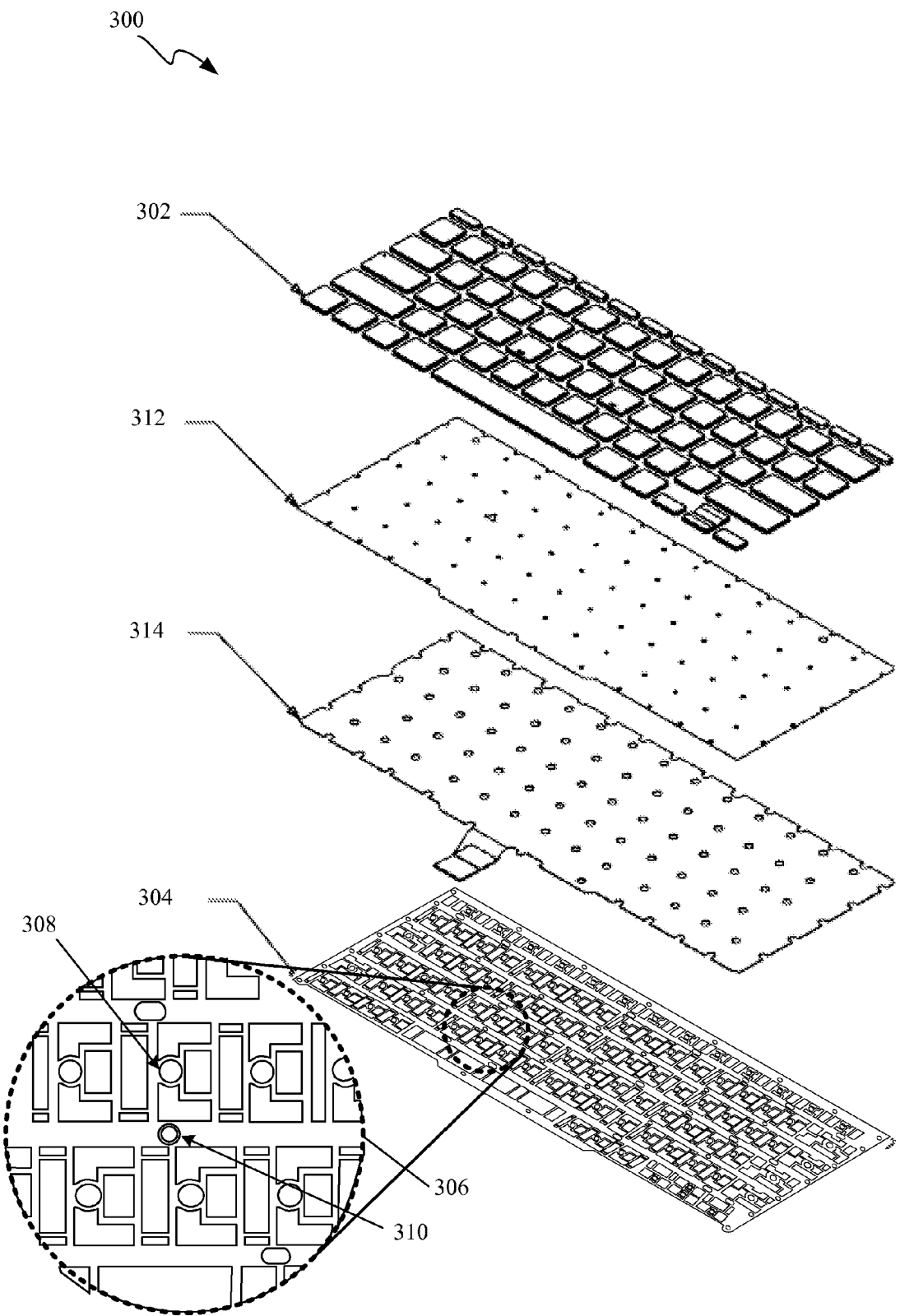
FIG. 3 illustrates in exploded perspective view a keyboard module in accordance with the described embodiments.

Continuing with FIG. 3, a keyboard module 300 in accordance with the described embodiments is illustrated in exploded perspective view. As shown, keyboard module 300 can include a plurality of key caps or pads 302 and a feature plate 304 as outside components. Feature plate 304 is shown with a number portions removed in the form of cutouts. When feature plate 304 is made from a high strength material such as steel, cutting out non-essential portions of the feature plate can allow for a reduction in weight. Close up view 306 shows cut out 308 which for example can be centered below one of the keypad positions. Cavity 310 can be used to mount a fastener used to secure keyboard module 300 to a computer enclosure. Mounted between plurality of key caps 302 and feature plate 304 are dome sheet 312 and printed circuit board (PCB) membrane 314, which interact to facilitate electrical contacts wherever a corresponding key cap 302 is depressed. Dome sheet 312 can be formed from Mylar® or rubber, for example.

Welding is one efficient way to attach components to a device. In the welding process an area of sheet metal in contact with another metal surface with similar thermal properties is typically heated so that the two materials will melt enough to bond to each other. In this way a feature plate 304 made of aluminum can be quickly and easily welded directly to top case housing 200 made of aluminum. Unfortunately a component such as feature plate 304 made of aluminum must typically be about 0.4 mm thick to provide a stable enough base for the stresses that can be expected to be exerted on keyboard assembly 300. Although a depth of 0.4 mm might not seem problematic, the overall depth of some small form factor portable computers, such as the MacBook Air® manufactured by Apple Inc. of Cupertino, Calif., can be as thin as 3 mm in which case a 0.4 mm aluminum plate would account for about 10% of the total Z height of the laptop. Therefore a stronger and stiffer material such as steel would be preferable to one formed of aluminum as a feature plate made of steel could provide about the same stable feel and support with about half the thickness. It should be noted that since steel is both stronger and stiffer than aluminum, a 0.2 mm thick steel feature plate having a lattice support structure could replace its 0.4 mm solid aluminum counterpart. Although stainless steel has almost three times the density of aluminum the lattice support structure allows a steel feature plate 304 to have about the same weight as an equivalent aluminum feature plate.

Figure 4A:
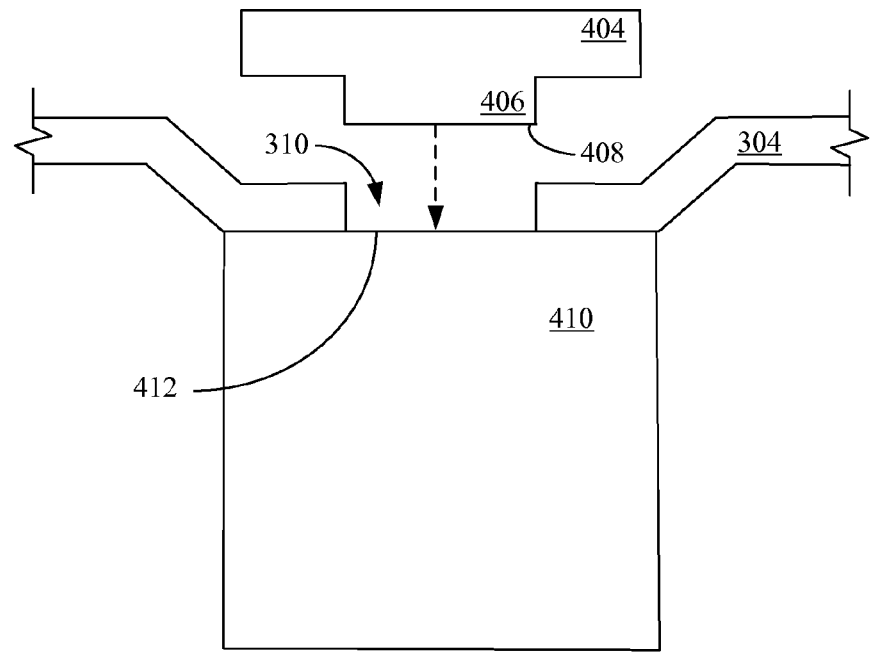
FIGS. 4A, 4B, and 4C illustrate techniques for attaching together a first and second component in accordance with the described embodiments.
Figure 4B:
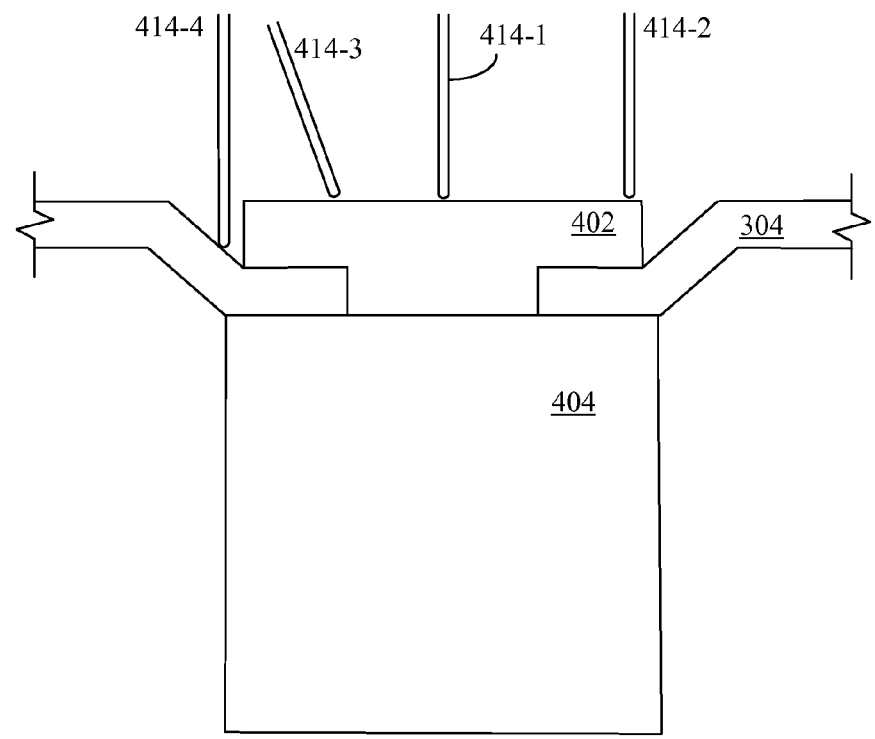
Figure 4C:
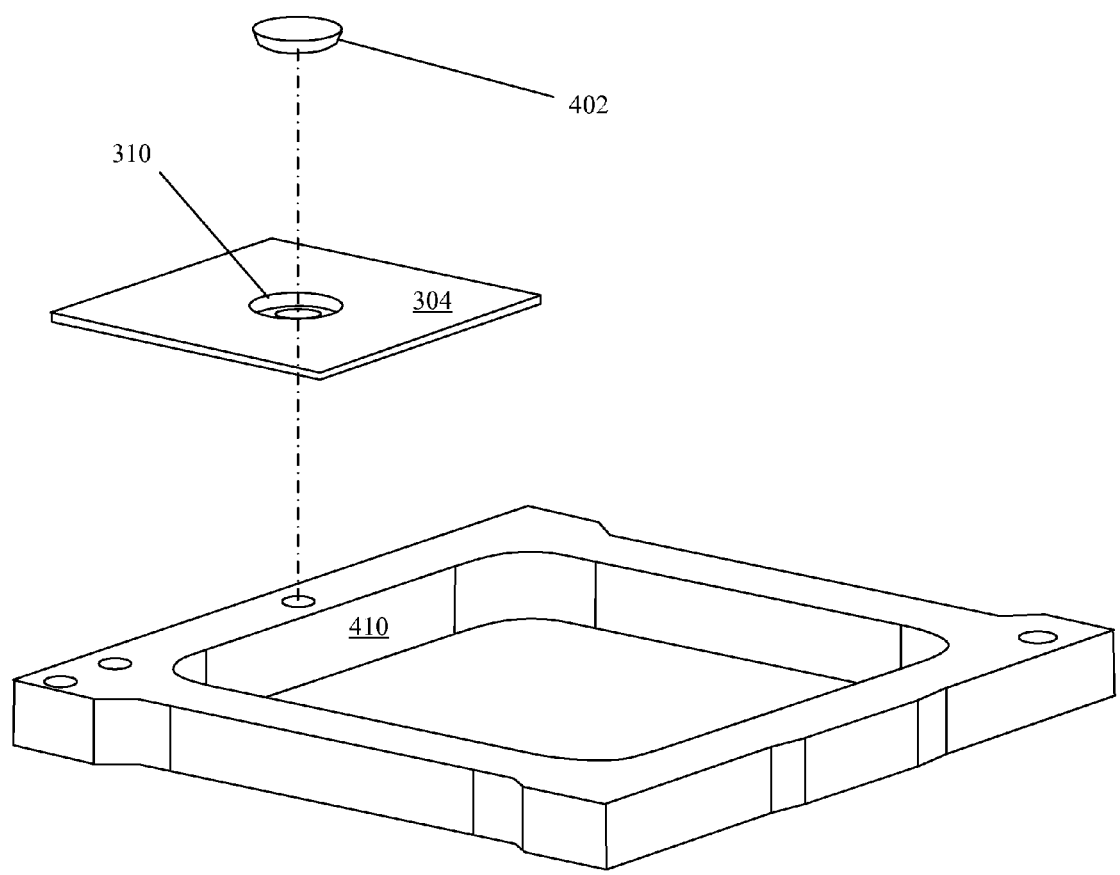

FIGS. 4A, 4B and 4C illustrate techniques for attaching together a first and second component in accordance with the described embodiments. In particular, the first component can take the form of a top case whereas the second component can take the form of a feature plate. The top case can be formed of metal such as aluminum and the feature plate can be formed of materials such as steel which as well known in the art are materials that are difficult to weld together. FIG. 4A shows securing plug 402 in a position to be placed within cavity 310 of steel feature plate 304. Securing plug 402 can include top portion 404, and body portion 406 having bottom surface 408. Securing plug 402 can be formed of many materials such as aluminum. Therefore, for the remainder of this discussion securing plug 402 will be described in terms of aluminum securing plug 402 without loss of generality. Also shown is aluminum top case 410 with top surface 412. FIG. 4B shows that once aluminum securing plug 402 is in place, and bottom surface 408 is in contact with top surface 412, a portion of top portion 404 of aluminum securing plug 402 can be used as a target for receiving thermal energy in the form of a laser beam, for example. Preferably laser beam 414 will strike top portion 404 as shown by laser beam 414-1; however one of the advantages of using top surface 404 as the laser target is that the laser can impinge at almost any point on top surface 404 (illustrated by laser beams 414-2, and 414-3) and still deliver sufficient thermal energy for proper welding. Even if laser beam 414 misses top surface 404 completely (illustrated by laser beam 414-4) conduction from steel feature plate 304 to aluminum securing plug 402 could be sufficient to weld aluminum securing plug 402 to aluminum top case 410. Another advantage of the described embodiment is that since the melting point of aluminum is much lower than that of steel, laser beam 414-4 should not do any significant damage to steel feature plate 304. Once aluminum securing plug 402 is welded to aluminum top case 404, steel feature plate 304 is effectively secured between aluminum securing plug 402 and aluminum top case 410. FIG. 4C shows an exploded perspective view of single aluminum securing plug 402 securing steel feature plate 304 to aluminum top case 410. In FIG. 4C only a small portion of steel feature plate 304 and aluminum top case 410 are shown for simplicity sake. The rectangular hole shown in aluminum top case 410 is the portion of aluminum top case 410 illustrated in FIG. 2 as keyboard opening 202. This process illustrated in FIGS. 4A-4C can be repeated a number of times across the surface of steel feature plate 304 in a number of cavities 310 to completely secure steel feature plate 304 to aluminum top case 410. In one particular embodiment, a total of forty (40) aluminum securing plugs 402 can be used, although more or fewer plugs are certainly possible.

Figure 5A:
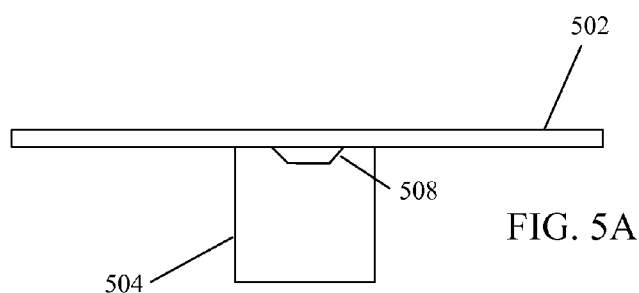
FIGS. 5A, 5B, 5C, and 5D illustrate four steps of an optional stamping process for efficiently seating aluminum securing plugs.
Figure 5A:
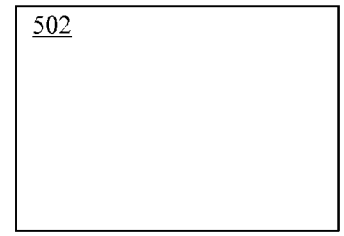
Figure 5B:
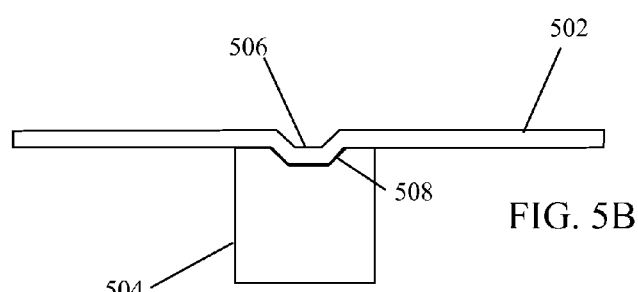
Figure 5B:
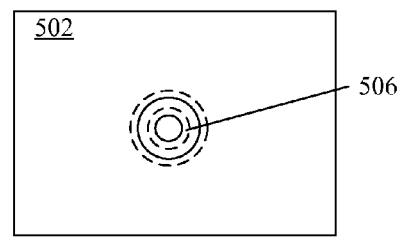
Figure 5C:
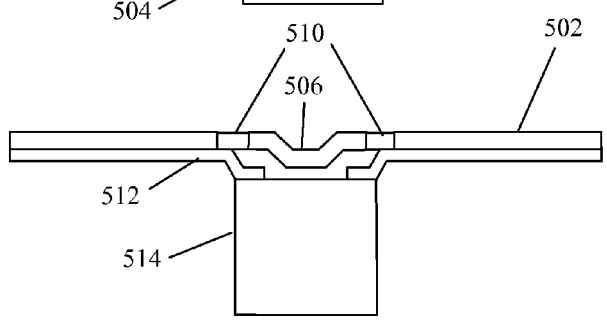
Figure 5C:
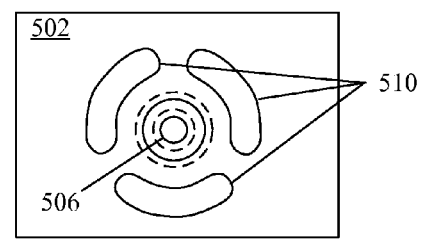
Figure 5D:
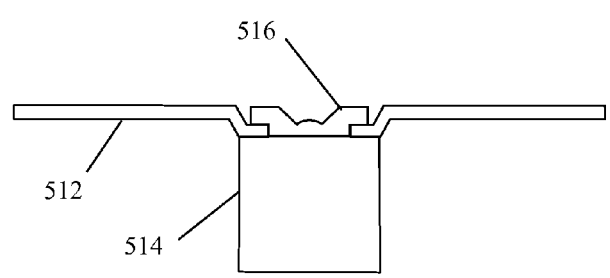
Figure 5D:
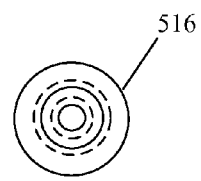

FIGS. 5A, 5B, 5C, and 5D show four steps of an optional stamping process for efficiently seating the aluminum securing plugs. Each figure shows both a side view and top view for each step. Much of the efficiency gained by this innovation could be lost if aluminum securing plugs had to be individually placed into the feature plate. In FIG. 5A a thin aluminum sheet 502 of about the same area as the steel feature plate is obtained and placed over shaping anvil 504. FIG. 5B shows how pre-formed securing plugs 506 can be stamped into aluminum sheet 502 over shaping anvil 504, where shaping anvil 504 has a recess 508 for each desired aluminum securing plug location. FIG. 5C shows cutouts 510 stamped out of aluminum sheet 502. After cutouts 510 are made aluminum sheet 502 is positioned over feature plate 512, which has is then lined up with anvil 514. In FIG. 5D a swaging force can separate aluminum securing plug 516 from aluminum sheet 502, and can slightly deform each aluminum securing plug 516 so that the bottom of each aluminum securing plug 516 aligns with the bottom surface of feature plate 512. After the waste from aluminum sheet 502 is removed, feature plate 512 with securing plugs 516 in place can be removed from anvil 514, aligned over aluminum top case 410 and then automated laser beam welders can quickly secure feature plate 512 to aluminum top case 410 by welding aluminum securing plugs 516 to aluminum top case 410.

Figure 6:
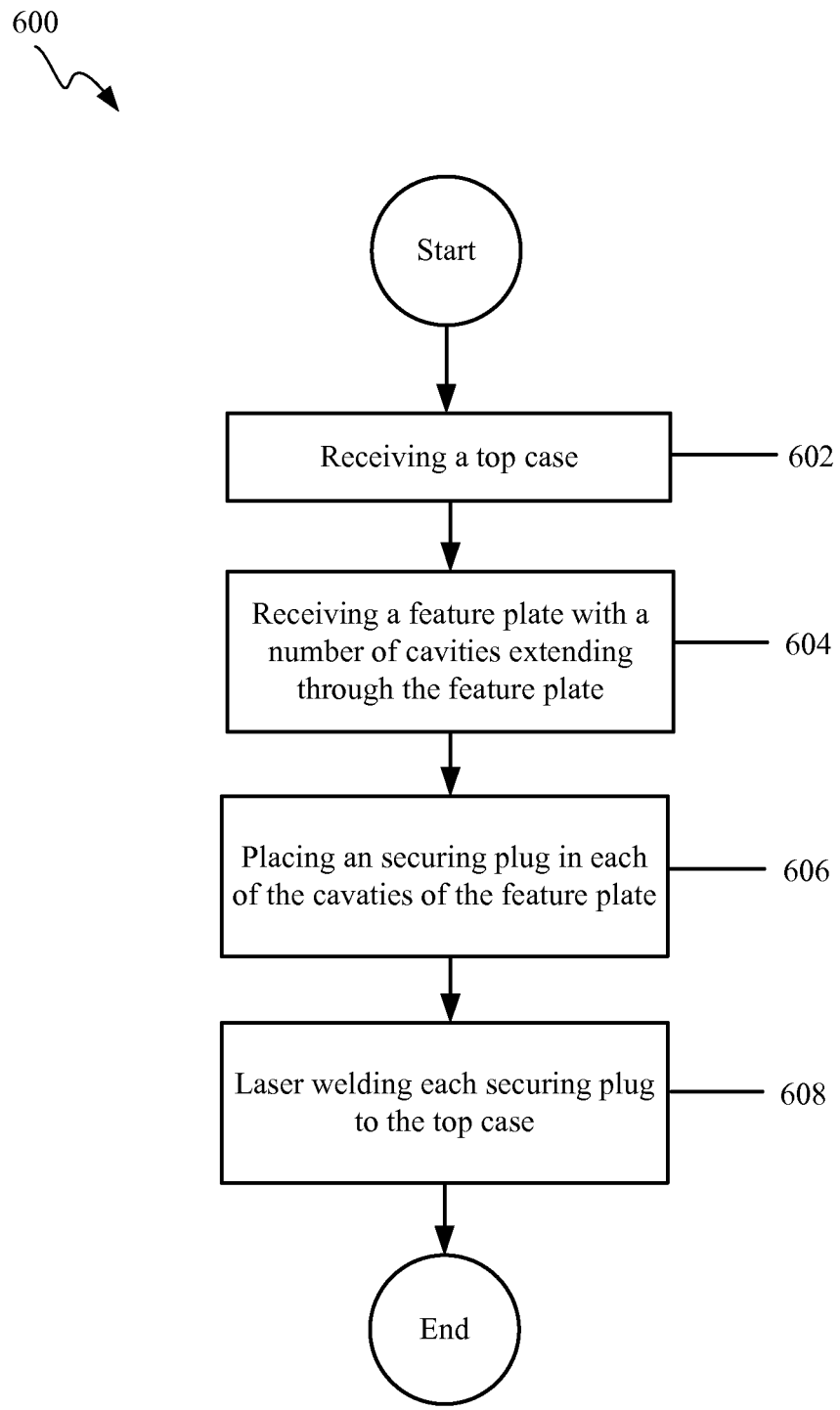
FIG. 6 shows a flowchart describing process 600 for securing a feature plate to a top case in accordance with the described embodiments.

FIG. 6 shows a flowchart describing process 600 for securing a feature plate to a top case in accordance with the described embodiments. Process 600 begins at step 602 with receiving a top case. The top case can include a number of keyboard openings for the keyboard keys to fit through. At step 604 a feature plate is received. The feature plate includes a number of cavities extending through it. The feature plate can be made of a sturdy material, which allows the feature plate to maintain both a low Z thickness and a sturdy support structure. At step 606 the cavities in the feature plate allow securing plugs to be placed in contact with both the steel feature plate and the aluminum top case. Finally in step 608 each securing plug is heated sufficiently so as to bond a bottom portion of the securing plugs to a top surface of the top case. Once the securing plugs are bonded to the top case, the feature plate is effectively secured between the top case and the securing plugs.

Figure 7:
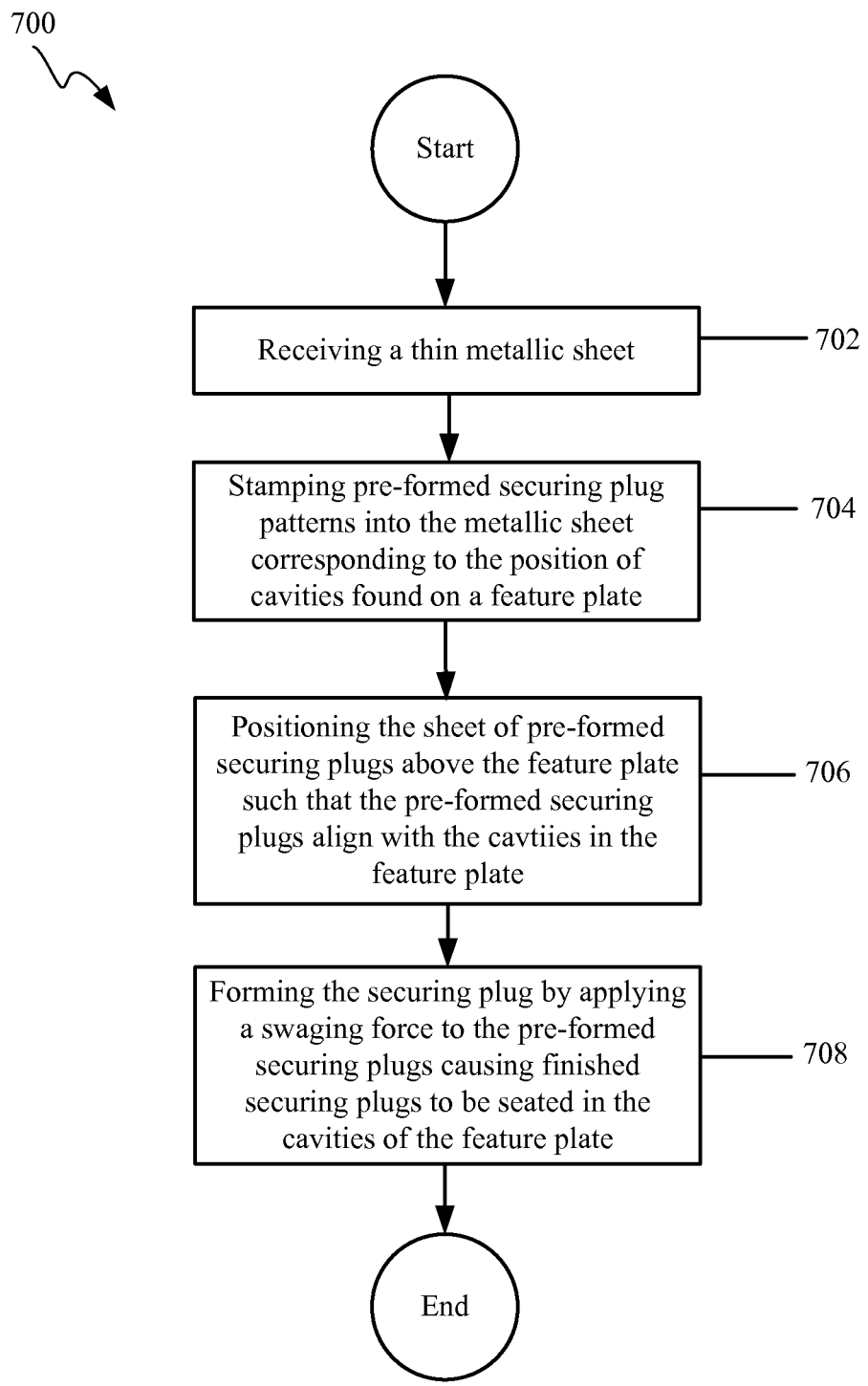
FIG. 7 shows a flowchart describing process 700 for placing securing plugs in a feature plate in accordance with the described embodiments.

FIG. 7 shows a flowchart describing process 700 for efficiently securing a feature plate to a top case. Process 700 begins at step 702 with receiving a thin metallic sheet of about the same area as the feature plate. The thin metallic sheet can be made of many materials such as aluminum. In step 704 pre-formed securing plug patterns are stamped into the metallic sheet. Each pre-formed securing plug pattern can include a central plug region and a circumferential cutout region. In step 706 the pre-formed securing plug patterns can be aligned with the corresponding cavities of the feature plate. In step 708 a swaging force can be applied to the pre-formed securing plug patterns. The swaging force separates the pre-formed securing plug patterns from the metallic sheet by severing the sheet metal remaining between the circumferential cutout regions and slightly deforms the central plug region so it can be in contact with the top case.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for welding together a first component formed of a first material and a second component formed of a second material having a plurality of cavities each of which extend through the second component, comprising:
    positioning an aluminum sheet comprising a plurality of embedded pre-formed securing plugs in relation to the second component such that the embedded pre-formed securing plugs align with corresponding ones of the plurality of cavities, each of the embedded pre-formed securing plugs comprising a protrusion and a plurality of cutouts defining a periphery of the embedded pre-formed securing plugs;
    using a swaging force to separate the embedded pre-formed securing plugs from the aluminum sheet, and to mechanically deform the pre-formed securing plugs in accordance with both a top surface of the first component and a portion of the second component surrounding the corresponding cavity; and
    directing an amount of energy at any location of a top portion of each of the securing plugs, the amount of energy being sufficient to fuse at least some of the securing plug and at least some of the first portion of the first component without substantially affecting the integrity of the second component.

2. The method as recited in claim 1, wherein the amount of energy directed on the top portion of the securing plug is provided by a laser beam.

3. The method as recited in claim 2, wherein the first component is a top case and wherein the second component is a feature plate.

4. The method as recited in claim 3, wherein the first component and the securing plug are formed of aluminum and wherein the second component is formed of steel.

5. The method as recited in claim 1, wherein a geometry of a bottom surface of each of the securing plugs is redefined when the swaging force is applied, and wherein surfaces of the first component and the second component cooperate to redefine the geometry of the bottom surface that is complementary to portions of both the first component and the second component.

6. A non-transitory computer readable medium including at least computer program code executed by a processor in a computer manufacturing apparatus for welding together a first component formed of a first material and a second component formed of a second material having a plurality of cavities each of which extend through the second component, the computer readable medium comprising:
    computer code for positioning an aluminum sheet comprising a plurality of preformed securing plugs in relation to the second component such that the pre-formed securing plugs align with corresponding ones of the plurality of cavities, each of the pre-formed securing plugs comprising a protrusion and a plurality of cutouts defining a periphery of the pre-formed securing plugs
    computer code for separating the pre-formed securing plugs from the aluminum sheet by applying a swaging force to each of the pre-formed securing plugs, the swaging force also mechanically deforming the pre-formed securing plugs in accordance with both a top surface of the first component and a portion of the second component surrounding the corresponding cavity; and
    computer code for directing an amount of energy at any location on a top portion of the securing plug, the amount of energy being sufficient to fuse at least some of a bottom portion of the plug and at least some of a top portion of the first component without substantially affecting the integrity of the second component.

7. The non-transitory computer readable medium of claim 6, wherein the computer code for directing an amount of energy comprises:
    computer code for actuating a laser to provide the amount of energy directed on the top portion of the securing plug.

8. The non-transitory computer readable medium of claim 7, wherein the first component is an aluminum top case and wherein the second component is a steel feature plate.

9. A method for welding together a first component formed of a first material and a second component formed of a second material having a plurality of cavities each of which extend through the second component, the method comprising:
    positioning an aluminum sheet comprising a plurality of pre-formed securing plugs such that the pre-formed securing plugs align with corresponding ones of the plurality of cavities of the second component, each of the pre-formed securing plugs comprising a protrusion and a plurality of cutouts defining a periphery of the pre-formed securing plugs; and
    applying a swaging force to each of the pre-formed securing plugs to separate the pre-formed securing plugs from the aluminum sheet and to mechanically deform the pre-formed securing plugs in accordance with both a top surface of the first component and a portion of the second component surrounding the corresponding cavity.

10. The method as recited in claim 9, wherein the first component is a top case and wherein the second component is a feature plate.

11. The method as recited in claim 10, wherein the first component and the securing plug are formed of aluminum and wherein the second component is formed of steel.

12. The method as recited in claim 9, further comprising:
   directing an amount of energy to a top portion of each of the plurality of securing plugs, the amount of energy being sufficient to fuse at least a portion of the securing plug to the surface of the first component without substantially affecting the integrity of the second component.

13. The method as recited in claim 12, wherein the energy directed at the securing plugs is emitted by a laser.

* * * * *